(12) United States Patent
Eisele

(10) Patent No.: US 6,722,570 B1
(45) Date of Patent: Apr. 20, 2004

(54) SMART DATA STORAGE DEVICE

(75) Inventor: Raymund H. Eisele, Idstein (DE)

(73) Assignee: SmartDisk Corporation, Naples, FL (US)

( * ) Notice: Subject to any disclaimer, the term of this patent is extended or adjusted under 35 U.S.C. 154(b) by 1,667 days.

(21) Appl. No.: 08/420,796

(22) Filed: Apr. 12, 1995

Related U.S. Application Data

(63) Continuation of application No. 07/947,570, filed on Sep. 21, 1992, now abandoned, which is a continuation of application No. 07/448,093, filed on Dec. 12, 1989, now Pat. No. 5,159,182.

(30) Foreign Application Priority Data

Dec. 12, 1988 (DE) .......................................... 38 41 776
Feb. 6, 1989 (DE) .......................................... 39 03 454

(51) Int. Cl.⁷ .............................................. G06F 17/60
(52) U.S. Cl. .................... 235/492; 235/492; 235/493; 235/449; 235/487; 380/3; 380/4; 380/25; 360/137; 360/132; 360/133; 369/14; 369/53; 395/186; 395/187.01; 395/188.01
(58) Field of Search ............................... 235/492, 493, 235/449, 487, 380; 380/3, 4, 25; 360/137, 132, 133; 369/14, 53; 395/186, 187.01, 188.01

(56) References Cited

U.S. PATENT DOCUMENTS

| | | | |
|---|---|---|---|
| 3,946,156 A | | 3/1976 | Budrose ................... 360/134 |
| 4,034,164 A | | 7/1977 | Westmoland ............... 360/137 |
| 4,446,519 A | * | 5/1984 | Thomas |
| 4,504,871 A | * | 3/1985 | Berwick et al. ............. 360/31 |
| 4,575,621 A | | 3/1986 | Dreifus .................... 235/380 |
| 4,672,182 A | * | 6/1987 | Hirokawa |
| 4,701,601 A | * | 10/1987 | Francini et al. ............ 235/449 |
| 4,791,283 A | * | 12/1988 | Burkhardt ................. 235/438 |
| 4,868,373 A | * | 9/1989 | Opheij et al. |
| 4,891,727 A | * | 1/1990 | Sato et al. |
| 4,951,249 A | * | 8/1990 | McClung et al. |
| 4,959,861 A | * | 9/1990 | Howlette |
| 5,159,182 A | * | 10/1992 | Eisele ..................... 360/137 |
| 5,224,216 A | * | 6/1993 | Gordon et al. ............. 360/133 |
| 5,237,551 A | * | 8/1993 | Ogawa et al. .............. 369/54 |
| 5,267,311 A | * | 11/1993 | Bakhoum |
| 5,338,923 A | * | 8/1994 | Grieu .................... 235/492 |

FOREIGN PATENT DOCUMENTS

| | | |
|---|---|---|
| DE | 3534638 A1 | 5/1986 |
| DE | 3701114 A1 | 8/1987 |
| DE | 3903454 A1 | 6/1990 |
| DE | 4036336 | 5/1992 |
| EP | 0328124 A2 | 8/1989 |

OTHER PUBLICATIONS

IBM Technical Disclosure Bulletin, vol. 30, No. 3, Aug. 1987, "Personal Transaction Card", pp. 1262–1265.
IBM Technical Disclosure Bulletin, vol. 28, No. 6, Nov. 1985, "Transaction Handling System Using a Bank Card with Display, Input and Memory Functions", pp. 2568–2570.

* cited by examiner

*Primary Examiner*—James P. Trammell
*Assistant Examiner*—James A. Reagan
(74) *Attorney, Agent, or Firm*—Nixon & Vanderhye PC

(57) ABSTRACT

An insertable device, for use with electronic data processing equipment storage units, e.g., disk drives or cassette units. The device includes a housing for insertion at least partially into the storage unit of a size and shape designed to fit the storage unit, an interface disposed in the housing for facilitating the transfer of data between the device and the electronic data processing equipment, and a processor disposed in the housing and operatively connected to the interface, for performing processing of data.

18 Claims, 4 Drawing Sheets

SMART DATA STORAGE DEVICE

This application is a Continuation, of application Ser. No. 07/947,570, Filed Sep. 21, 1992, now abandoned, which is a continuation of Ser. No. 07/448,093, filed Dec. 12, 1989, now U.S. Pat. No. 5,159,182.

BACKGROUND INFORMATION

1. Field of the Invention

The invention is applicable to a magnetic-strip card, a diskette, a cassette or similar, and is basically an element fitted with an interface which can be inserted into Electronic Data Processing (EDP) equipment such as a magnetic read/write unit, diskette-drive, cassette-drive etc.

2. Background Information

In general, magnetic-strip cards are used in systems such as cash-dispensers, door-openers, automatic-timing systems etc. A disadvantage is that the magnetic-strips currently in use can quite simply be read by non-authorized users or even copied and/or altered. For this reason access to the above-mentioned types of EDP-equipment by non-authorized users cannot always be prevented with certainty at present.

Cards the size of a magnetic-strip card with a built-in processor can already be produced (Smart card). However, these type of cards can only be used in EDP systems equipped with special interfaces (with or without contacts) through which data can be exchanged between the card's processor and the EDP-equipment.

Typical EDP systems making use of diskettes, cassettes or similar data storage devices are computers, and Personal Computers (PCs) in particular. These are equipped with diskette or cassette drives according to which type of system is being used, with a read/write unit or head. This enables the data and programs stored on the data storage device to be read and transferred to the computer and additionally, to write programs and store data on the data storage devices. In this way one can store data and programs which are required in the computer on external storage devices. The disadvantage of the usual diskettes or cassettes is that they can easily be copied. For example, programs under copyright can be reproduced without paying license fees or restricted information can be copied and passed on to non-authorized persons.

At the same time it is impossible to be certain whether programs stored in a data storage device are in fact the original or whether they may have been tampered with by so-called computer-viruses or may contain a "trojan horse". To verify user-identities and/or to encrypt/decrypt data, plug-in boards for the databus or micro-channel of the computer are generally in use. However, these type of cards are expensive to produce and install and require hardware and software which has to be re-developed for each different type of computer system.

SUMMARY OF THE INVENTION

The purpose of the present invention is to safeguard access to and operation of EDP systems as simply as possible and to safeguard against unauthorized copying or alteration of data or programs.

Basically, the present invention solves this problem in that it is an insertable element for EDP-equipment which has a processor with a built-in memory and an interface designed in such a way that it is possible to exchange data between the element's processor and the EDP-equipment's read/write head (diskette drive, magnetic-strip read/write unit or similar).

An advantage of the present invention is that it is possible to carry out operations with the element's processor, such as encryption and decryption of data or verification of user identity, while at the same time not requiring a special interface or plug-in board which may be suitable only for a particular computer system.

The element according to an embodiment of the present invention is equipped with a battery, power source, and a driver which converts signals coming from the on-board processor into the required magnetic form at an interface and converts signals coming from the EDP-equipment through the interface into the required form for the on-board processor accordingly. A further feature of the element according to an embodiment of the invention is the ability to be able to store additional data and/or programs in memory which is connected with the on-board processor. As described below, this considerably increases the areas of application for the invented element. At the same time the battery also supplies power to the other electronic components within the element. In the case of a diskette or cassette, the necessary power can be provided by an electric-generator the rotor of which is turned by the drive-shaft of the diskette-drive or by the tape-spools. The induced electric-current is controlled by a regulator in such a way that a battery could be dispensed with. However, memories which require a constant flow of electric-current need to be equipped with a battery. The electric-current supplied by the generator could also be used to recharge or back-up the battery's own power.

The use of terms such as Diskette, Cassette or similar should, within the frame of reference of this invention, be understood to mean parts having the external appearance of a Diskette, Cassette etc. It does not mean that the Diskettes or Cassettes mentioned necessarily contain magnetic-disks or tapes. The important point is that the element's interface can exchange data with the read/write heads of the relevant drive units. The actual function of data storage can be carried out by the memory adjacent to the on-board processor on the element.

Naturally, it would be possible to include a magnetic-disk or tape in the respective devices. In this case it may be advantageous to use the processor and its storage-facility to verify user identification and authorization. During subsequent normal operation the read/write head of the EDP-equipment could read or write magnetic signals onto the magnetic-disk or tape.

As previously mentioned, the interface of the invented element is developed in such a way as to allow data to be relayed through it between the processor and the magnetic-strip read/write apparatus or the read/write head of the Diskette/Cassette unit. One way of achieving this is to fit an electromagnetic component (e.g. one or more coils) in the vicinity of the interface which is able to generate magnetic-field information equivalent to that generated by the magnetic-strip of a magnetic-strip card, the magnetic-disk of a diskette or the magnetic-tape of a cassette etc. In this way the interface is, therefore able to simulate the magnetic-strip, the magnetic-disk or magnetic-tape. This property of the interface is such that it allows data to be transferred from the processor in the invented element to the EDP-equipment, e.g., data which enables user identification to be verified. It is also necessary for the interface to be able to receive signals coming from the EDP-equipment via the write head and to pass these on to the processor inside the invented element. Such an exchange of data makes a variety of operations possible thereby enabling the required results to be achieved, and others also. A coil or coils connected to a driver in the vicinity of the interface can perform these functions if this driver for its part, is able to communicate with the processor.

By the use of a diskette with a magnetic-disk and a cassette with magnetic-tape it is possible to install a read/write head inside the diskette/cassette. This enables the magnetic medium (tape or disk) to be used as an intermediate storage-facility in that data supplied by the processor is initially recorded on the medium and then read by the read/write head of the EDP-equipment. Obviously it is also possible for data to be transferred in the opposite direction, i.e., recording of data by the read/write head of the EDP-equipment on the medium and the subsequent reading of this data by the read/write head in the diskette or cassette.

According to a further feature of the invention, the interface of the element, which interface is designed to allow the transfer of data between the element's processor and the EDP-equipment through the EDP-equipment's own read/write facilities, is an optical interface. The interface of a diskette according to the invention preferably is designed in a manner that it simulates an optical readable/writable disk.

Details, areas of application and the advantages of this invention are illustrated in the diagrams with schematic examples.

DETAILED DESCRIPTION OF THE PREFERRED EMBODIMENT(S)

Figure 1:
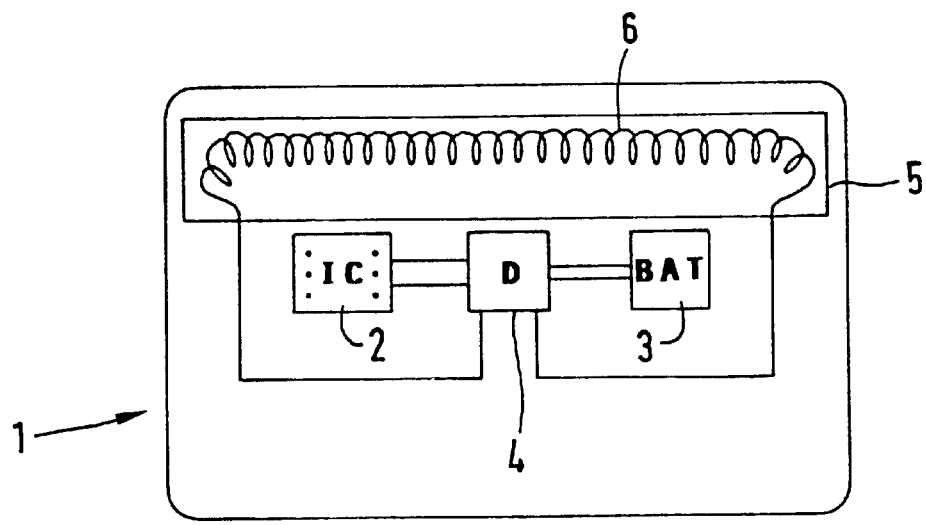
FIG. 1 is a smartcard according to an embodiment of the invention (Magnetic-Interface-Chip-Card (MICK))

The smart card according to an embodiment of the invention shown in FIG. 1 includes chip 2(IC), e.g., processor with integrated memory, the battery 3(BAT), and the driver 4(D or Driver). In section 5 in which the magnetic-strip is usually located in a conventional smart-card 6 there is an interface through which data can be transmitted between the processor 2 and a magnetic-strip read/write device. In the diagrams a coil symbolises one or more components which are able to generate and receive magnetic-field data.

One of the advantages of a card designed and produced in this way is that stored data (e.g. the validity of the card) can not only be verified but also altered by authorized parties. If any of the information has to be changed it is no longer necessary to replace the card.

If the card is equipped with a numerical display and a key pad (not illustrated) a PIN (Personal Identification Number/Password) can be entered into the card itself and not on the keyboard of the machine—this makes it much more difficult to ascertain the PIN by illegal means. Basically, any type of communication is possible between the processor of the smart card and the appropriate EDP-equipment. For these types of operations it is necessary for the smart card to have some sort of display, e.g., an LCD.

Figure 2:
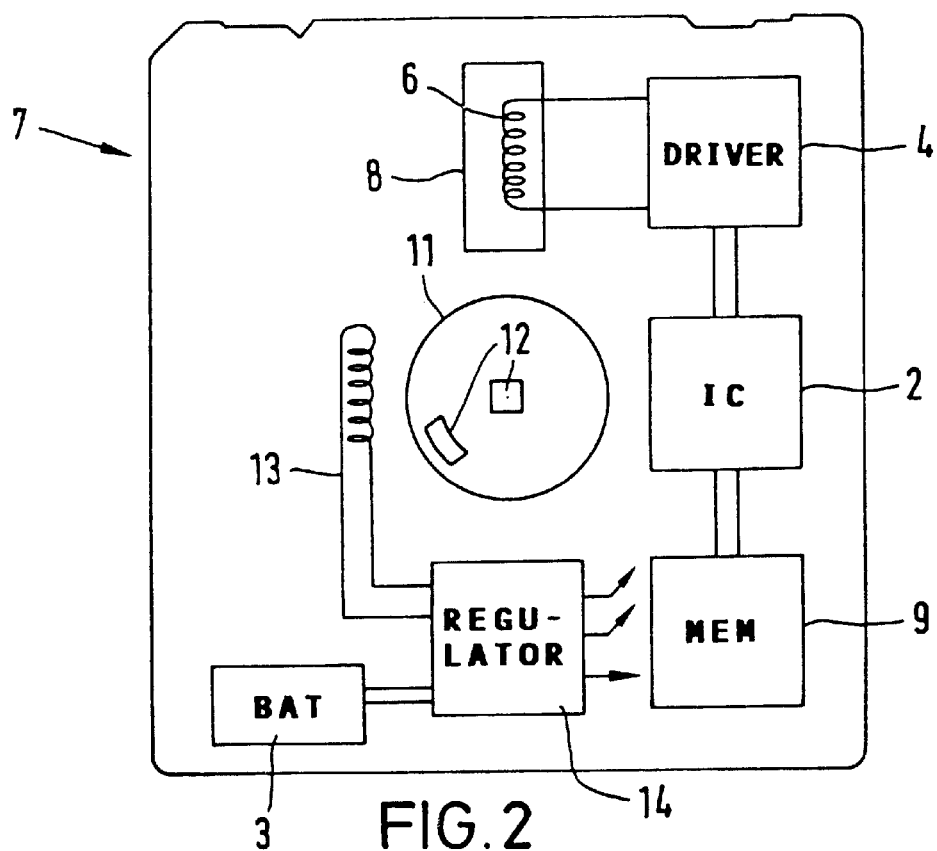
FIGS. 2 and 3 show a respective embodiment of a diskette according to the invention with and without a magnetic-disk (SMART-Diskette)

FIG. 2 shows a diskette 7 according to the invention without a magnetic-disk. In the area (aperture 8) facing the read/write head of the relevant diskette drive, interface 6 is located and is connected to driver 4(D). The latter is connected to the processor 2 which may itself be connected to additional memory 9(MEM).

Again, a battery 3(BAT) provides the individual components with electrical power. In addition there is also an electric generator consisting of rotor 11—attached to drive-unit 12 of the magnetic-disk (not illustrated), stator 13 and regulator 14(R or REGULATOR). This regulator 14 controls the generated electric current and/or keeps battery 3 sufficiently charged. Interface 6 at aperture 8 enables communication to take place between processor 2 and a central computer via its diskette drive. The advantages of this will be elaborated upon later.

Figure 3:
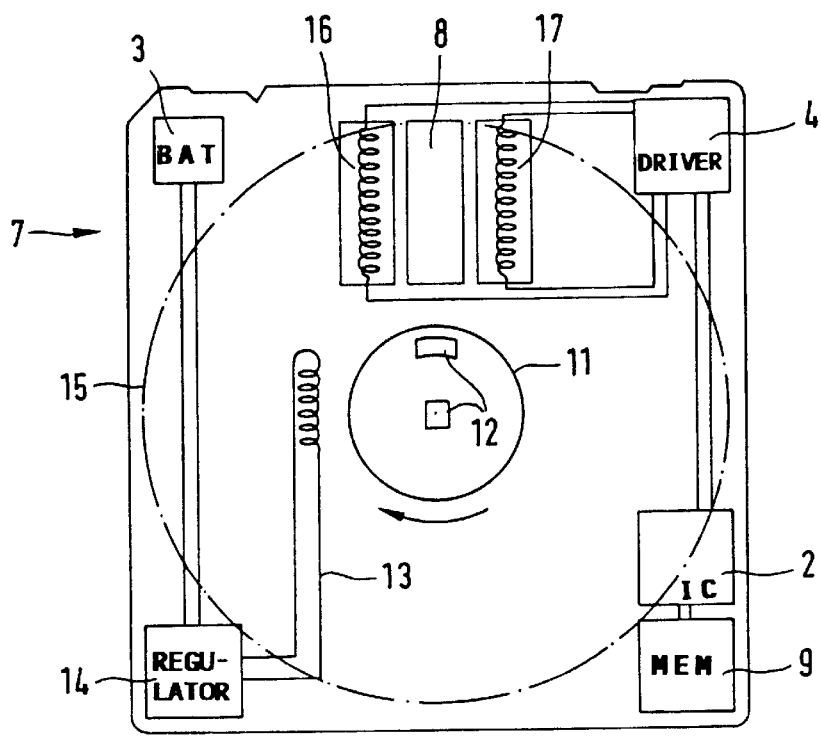

The diskette 7 shown in FIG. 3 differs from its counterpart in FIG. 2 in that it includes a magnetic-disk 15 and has read/write heads 16 & 17 of known design instead of the magnetic-interface 6 of FIG. 2. It is necessary for read head 17 and write head 16 to be located as shown in FIG. 3 sideways next to aperture 8. In this model, data is transferred from processor 2 to the central-unit of a related computer, for example, in such a way that head 16 writes this data onto magnetic-disk 15 using it as an intermediate memory which is then read by the read/write head of the computer's diskette-drive.

Figure 4:
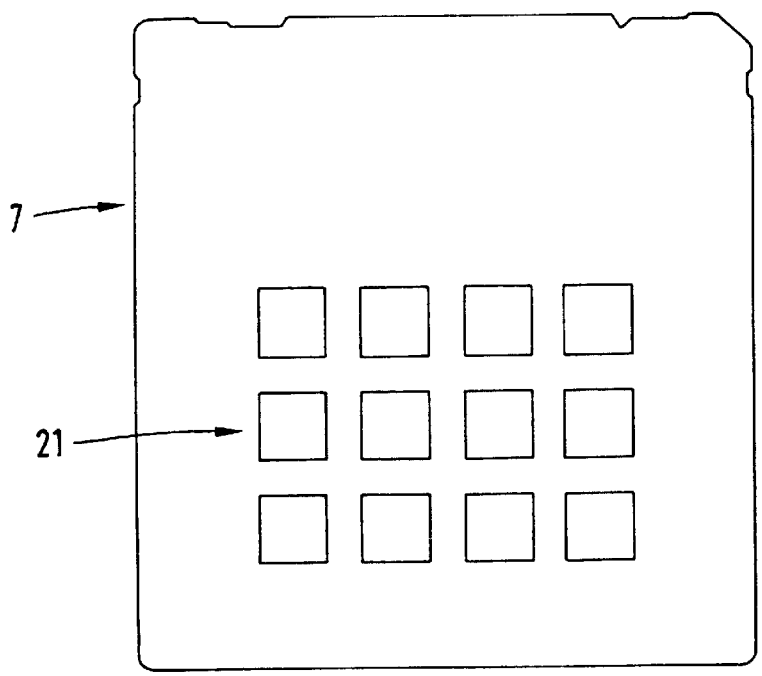
FIGS. 4, 5 and 6 illustrate different types of SMART-Diskettes (PIN-SMART and SUPER-SMART-Diskette) according to the invention.
Figure 5:
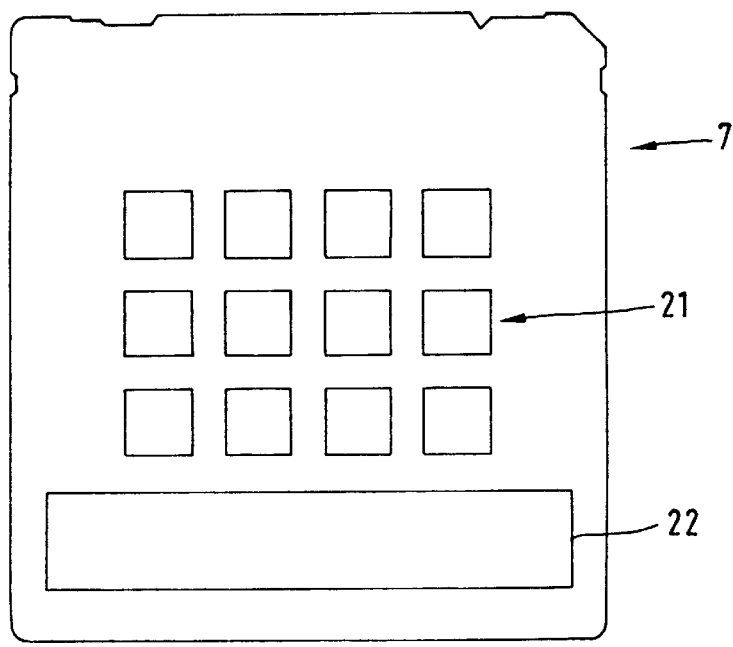
Figure 6:
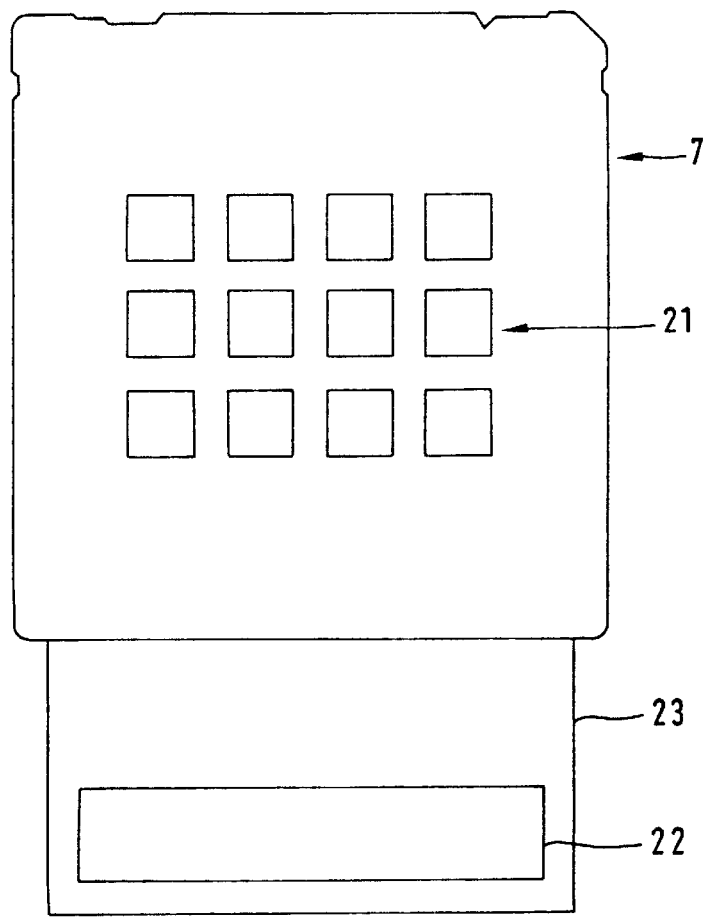

FIGS. 4–6 show the external appearance of diskette 7, e.g., with numerical display, i.e., key pad 21 and/or display 22. The model shown in FIG. 6 has keypad 21 and/or display 22 in the form of a separate module 23 attached physically and electrically to diskette 7 so that it is visible even when the diskette is inside the computer terminal. The card illustrated in FIG. 1 and cassettes shown in FIGS. 7 & 8 can be equipped with a key pad 21 and/or display 22, 23 of this type as required.

Figure 7:
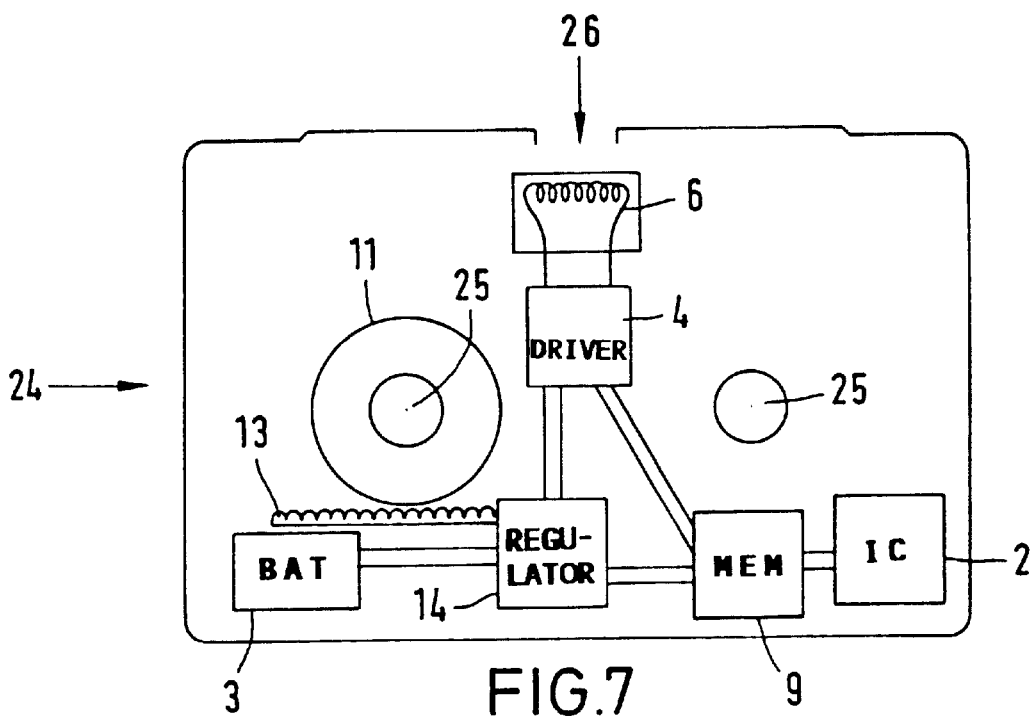
FIGS. 7 and 8 show a respective embodiment of a cassette according to the invention (SMART-Cassette).
Figure 8:
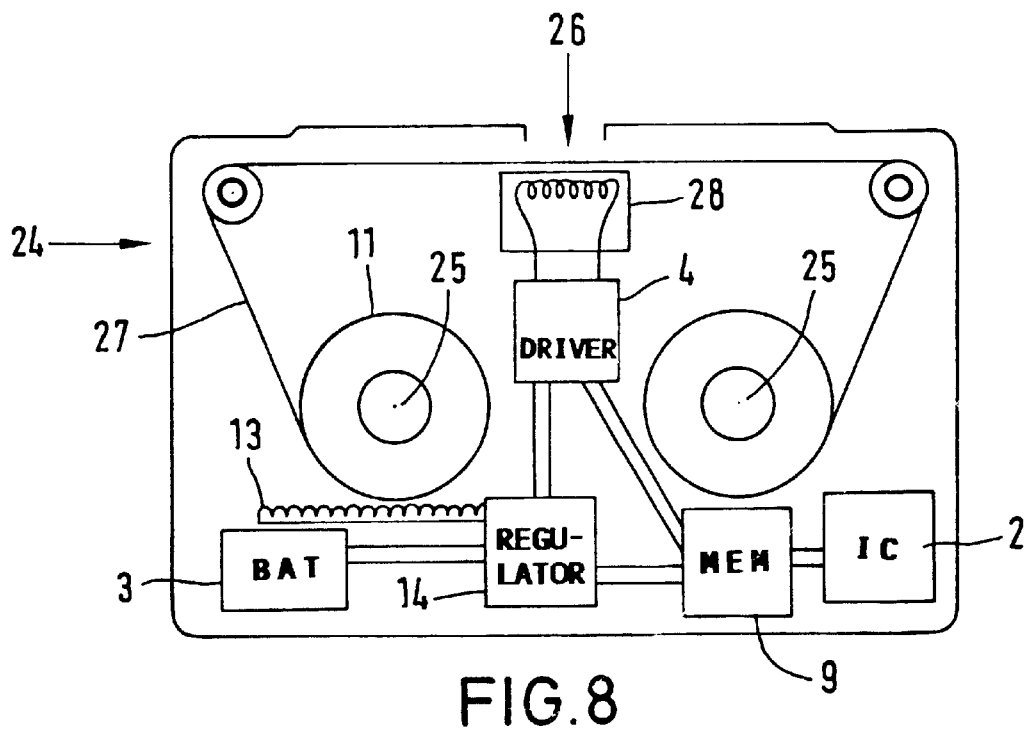

The cassettes illustrated in FIGS. 7 & 8 show—as do the diskettes in FIGS. 2 & 3—processor 2, battery 3, driver 4, additional memory 9, power generator 11, 13 and regulator 14. Rotor 11 is connected to drive-system 25 for magnetic-tape 27.

The model shown in FIG. 7 does not have a magnetic-tape 27. In the area marked 26 facing the read/write head of the cassette-terminal, interface 6 is located. This is able to simulate the magnetic-tape 27 and enables data to be exchanged between processor 2 and the central-unit of the relevant computer.

The model illustrated in FIG. 8 does include a magnetic-tape 27. Facing this tape 27 is a read/write head 28 of usual design. As described in the case of the diskette 7 in FIG. 3, the data storage (in this case the tape—27) is used as an intermediate storage facility for data transmission between processor 2 and the computer.

FIG. 9 shows interaction between the device and EDP equipment.

A particular advantage of the described diskettes and cassettes is that they have a processor with which procedures such as verification of user authorization, encryption and decryption of data and protection of copyright can be carried out, as shown for example in FIG. 9.

To verify user authorization a PIN-code is necessary which is entered either on the keyboard of the EDP-equipment and communicated through the relevant interface (6, 8, 26) into processor 2 or, if the element itself is equipped with a key pad, entered into its key pad. At this point, the PIN is verified, the result of which procedure is passed back to the EDP-equipment via the interface, as shown for example in FIG. 9. The alteration of the PIN-code or similar information kept in processor 2 or its memory 9 is also possible (assuming the necessary authorization) using a similar procedure See FIG. 9.

It is also possible to use the invented device to check whether the user is working on the correct computer. Accordingly the central computer asks the user for an additional secret code after the PIN has been verified which is also verified by processor 2. The result of this procedure can be shown on display 22. Of advantage here is the display shown in FIG. 6 which allows the result to be read without removing the element from the terminal-socket.

It is of particular advantage also to be able to use processor 2 in the various elements to encrypt and decrypt data by transmitting plaintext data to processor 2 through the interface and back in encrypted form through this interface. For example, message authentication codes and digital signatures based on RSA-algorthm can be generated and verified as well as digital envelopes can be sealed and opened.

In order to use any of the elements as an encryption/decryption machine, it is necessary to load the element's memory units with one or more cryptographic algorithms, secret codes etc. in such a way that they cannot be reproduced.

To prevent unauthorized copying of programs or sections thereof it is possible to store parts of these or the whole programs in the elements' processors. A program is particularly safe from unauthorized reproduction if one section is stored in the EDP-equipments' computer and the rest in processor 2 of any of the invented elements.

What is claimed is:

1. A data security system for electronic data processing equipment, the electronic data processing equipment having a central processing unit with a storage unit, the storage unit being one of a diskette drive and a tape cassette storage unit having at least one magnetic read/write head, and a device for providing data security, the device comprising:

housing means for housing components of the device, and for insertion into the storage unit, the housing means being of a shape and size of one of a diskette and a cassette housing and being designed to fit at least partially into and operatively engage the storage unit;

a single interface means disposed in said housing means, for transferring data to and from the device and the at least one magnetic read/write head of the storage unit of the electronic data processing equipment;

data processor means, disposed in said housing means and operatively connected to said interface means, for performing processing of data to enable secure access, encryption, and affecting operation of the electronic data processing equipment;

a battery, disposed in said housing means, for storing energy to operate the device; and wherein the interface means includes simulation means for simulating one of a diskette and a tape storage medium, the simulation means comprising driver circuit means operatively connected to the data processor means, for converting digital data signals from the data processor means into simulated storage media signals to be provided to the storage unit and for converting received signals from the storage unit into digital data signals for processing by the data processor means.

2. The data security system according to claim 1, further comprising:

memory means disposed in said housing means and operatively connected to the data processor means of the device, for storing at least one of data and programs.

3. The data security system according to claim 2, further comprising:

generator means for recharging the battery, the battery providing components of the device with power.

4. The data security system according to claim 2, wherein said data processor means includes protection means for protecting data in said memory means from unauthorized external access through said single interface means, wherein data stored in said memory means is accessible only by said data processor means of said device.

5. The data security system according to claim 2, wherein said memory means stores security data for use by said data processor means of the device during processing of data comprising at least one of:

one or more cryptographic algorithms, and one or more secret keys.

6. The data security system according to claim 2, wherein said device includes loading means for loading one or more programs for said processing means transferred thereto from the electronic data processing equipment through the storage unit, said interface means and said data processor means, into said memory means.

7. The data security system according to claim 2, wherein said data processor means of said device operates and communicates interactively with external electronic data processing equipment associated with the storage unit when inserted therein, such that at certain points in the execution of a program in the electronic data processing equipment, data is transferred to said device and processed therein, results thereafter being fed from said device to the electronic data processing equipment.

8. The data security system according to claim 1, wherein the interface means comprises:

electrical coupling means for providing signals to the storage unit in the same form as signals read from one of a diskette and a cassette.

9. The data security system according to claim 1, further comprising:

a key-pad for inputting data into the device having at least numerical and function keys, said key-pad being disposed on said housing means and operatively connected to said data processor means of the device.

10. The data security system according to claim 1, further comprising:

display means disposed on said housing means and operatively connected to said data processor means of the device, for displaying at least alpha-numeric data to a user of the device.

11. The data security system according to claim 1, further comprising:

a key-pad for inputting data into the device having at least numerical and function keys, said key-pad being disposed on said housing means and operatively connected to said data processor means of the device; and display means disposed on said housing means and operatively connected to said data processor means of the device, for displaying at least alpha-numeric data to a user of the device;

wherein said key-pad and said display means are configured as a modular unit attached physically and electrically to the device.

12. The data security system of claim 1, wherein the data processor means includes means for performing at least one of verification of user authorization, encryption of data, decryption of data, and protection of copyrighted material by interactive program control passing.

13. The data security system according to claim 12, wherein the data processor means of the device performs at least one of encryption and decryption of data, wherein encryption includes encrypting data received from the storage unit and transmitting encrypted data to the storage unit, and wherein decryption includes decrypting data received from the storage unit and transmitting decrypted data to the storage unit.

14. The data security system according to claim 1, wherein the interface means includes simulation means for simulating a storage medium by providing signals which change with time.

15. The data security system according to claim 1, wherein said interface means includes at least one magnetic coil, and wherein said interface means simulates one of a magnetic diskette and a magnetic tape by producing magnetic signals with said coil.

16. A method of operating a security system including a device for providing data security to enable secure access and operation of electronic data processing equipment, the electronic data processing equipment having a storage unit, a display and a first data processor means, the device being for insertion into the storage unit of the electronic data processing equipment, the storage unit including at least one read/write head and being one of a diskette drive and a tape cassette storage unit, the device including housing means for housing components of the device and for insertion into the storage unit, the housing means being of a shape and size of one of a diskette and a cassette housing and being designed to fit at least partially into and operatively engage the storage unit, a single interface means disposed in said housing means, for transferring data between the device and the at least one read/write head of the storage unit, and second data processor means disposed in said housing means and operatively connected to said interface means, for performing processing of data, the method comprising the steps of:

inserting the housing means of the device into the storage unit so that the device operatively engages with the storage unit and the at least one read/write head therein;

transferring user identification data input on the electronic data processing equipment to the second data processor means of the device from the electronic data processing equipment through the storage unit through the interface means and the at least one read/write head;

verifying user authorization, including processing the user identification data with the second data processor means of the device; and transferring to the electronic data processing equipment a verification result from the preceding verifying step and displaying the verification result on at least the display of the electronic data processing equipment.

17. A method of operating a security system including a device for providing data security to enable secure access and operation of electronic data processing equipment, the electronic data processing equipment having a storage unit, a display and a first data processor means, the device being for insertion into the storage unit of the electronic data processing equipment, the storage unit including at least one read/write head and being one of a diskette drive and a tape cassette storage unit, the device including housing means for housing components of the device and for insertion into the storage unit, the housing means being of a shape and size of one of a diskette and a cassette housing and being designed to fit at least partially into and operatively engage the storage unit, a single interface means disposed in said housing means, for transferring data between the device and the at least one read/write head of the storage unit, and second data processor means disposed in said housing means and operatively connected to said interface means, for performing processing of data, wherein both the device and the electronic data processing equipment are equipped with a key-pad for inputting data into the device having at least numerical and function keys, the key-pad of the device being operatively connected to the second data processor means of the device, and wherein the device is equipped with display means operatively connected to the second data processor means, for displaying data to a user of the device, wherein the key-pad and the display means are configured as a modular unit attached physically and electrically to the device, the method comprising the steps of:

inserting the housing means of the device into the storage unit so that the device operatively engages with the storage unit and the at least one read/write head therein:

inputting a user personal identification number into the device by numerical keys of the device key-pad, or inputting a user personal identification number on the keypad of the electronic data processing equipment and causing transfer of the personal identification number to the device in response to actuation of one of the function keys;

verifying user authorization, including processing the inputted user personal identification number in the second data processor means of the device;

transferring to the electronic data processing equipment a verification result from the preceding verifying step; and displaying a verification result from the preceding verifying step on at least one of the display of the electronic data processing equipment, or the display means.

18. Data security apparatus for electronic data processing equipment, the apparatus comprising:

housing means for insertion into a data storage unit of the electronic data processing equipment, the housing means being one of a diskette and a cassette housing of a shape and size designed to fit into and operatively engage the data storage unit;

a single interface means disposed in said housing means, for transferring data to and from the apparatus and the electronic data processing equipment through the data storage unit, the interface means including simulating means for simulating a cassette tape or a diskette storage medium; and data processor means, disposed in said housing means and operatively connected to said interface means, for performing processing of data to enable secure access and operation of the electronic data processing equipment, and for controlling the interface means.

* * * * *